2 Sheets:
Sheet 1.

M. C. Longacre.
Refrigerator.

No 2,773. Reissued Oct 8 1867.

Witnesses
Charles L. Smith
Charles Du Bois

Inventor
M. C. Longacre
By Munn & Co. Attys

2. Sheets.
Sheet 2.

M. C. Longacre.
Refrigerator.

No. 2,773. Reissued Oct. 8. 1867.

Witnesses
Charles D. Smith
Charles Du Bois

Inventor
M. C. Longacre
By Munn & Co
Attorneys

United States Patent Office.

MANOAH C. LONGACRE, OF CLEVELAND, OHIO.

*Letters Patent No.* 41,931, *dated March* 15, 1864; *reissue No.* 2,773, *dated October* 8. 1867

IMPROVED REFRIGERATOR.

The Schedule referred to in these Letters Patent and making part of the same.

TO ALL WHOM IT MAY CONCERN:

Be it known that I, MANOAH C. LONGACRE, of Cleveland, county of Cuyahoga, and State of Ohio, have invented a new and improved Mode of Constructing Refrigerators; and I do hereby declare that the following is a full and exact description thereof, reference being had to the accompanying drawings, and to the letters of reference marked thereon.

Figure 1:
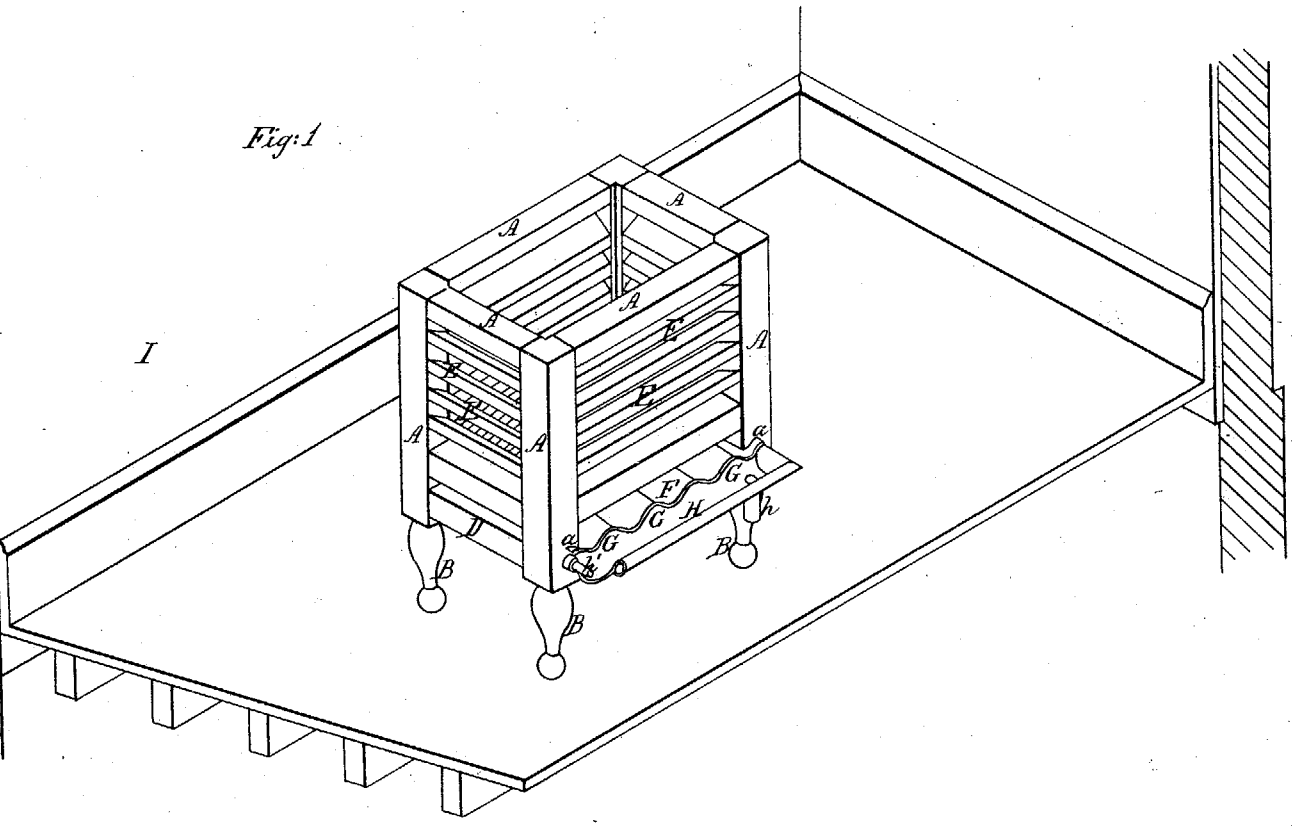
Figure 1 is a perspective view.
Figure 2:
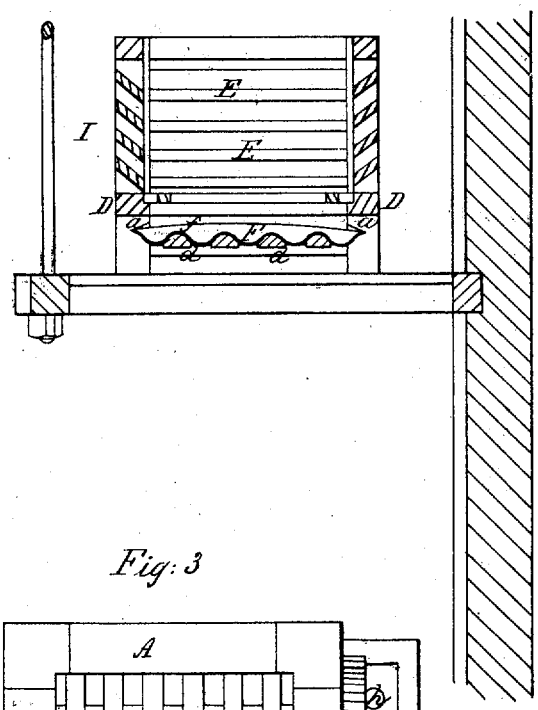
Figure 2 is a vertical longitudinal section.
Figure 3:
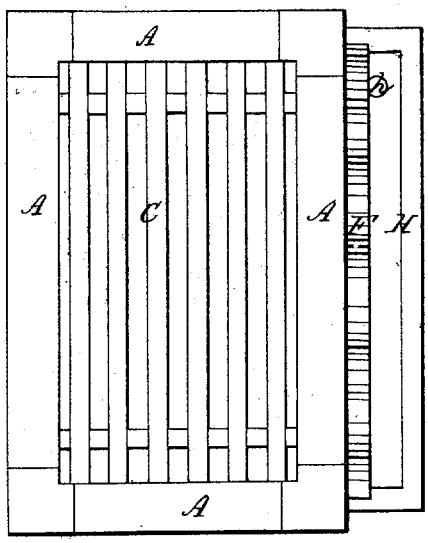
Figure 3 is a vertical cross-section.

The nature of this invention consists in providing an ice-box of peculiar construction, to be placed within a provision-room or refrigerator, whereby the atmosphere in said room or refrigerator is kept in a cool, dry state, adapted for the preservation of perishable articles of food.

To enable others to make and use my invention, I will proceed to describe its construction and operation.

I make a refrigerator-box, A, in the usual way, with the filling between the lining and outside, for a non-conducting medium; but I provide it with an ice-box constructed in the following manner: *a* represents the posts or corners of a rectangular box, whose sides are made open, in the form of slats *b* that slant inwards on all sides, so that all water caused by the ice melting is made to drip inside the spaces between them, also permitting a free circulation of air. C is a rack or false bottom, made of slats, upon which the ice rests, and through which the water also drips. This rack or false bottom rests at the ends of the slats upon transverse strips *d*, forming a ledge for that purpose, and having a groove, *c*, in their under side, to prevent any water from running back and dripping outside, but upon the second bottom. F is a corrugated metallic plate, the edges of which pass under and beyond the lower edge of the box B, and catches all the drippings of the melting ice. This corrugated plate rests on a rack, *g*, the ends *g'* being made a little wider, so as to give an inclination to the plate F. This is for the purpose of having the water run off. The rack C, plate F, and rack *g* are all movable, for the purpose of being taken out that they may be easily cleaned. At the lower end of the plate F there is a trough, *h*, into which the water runs from said plate. It also inclines, and is provided at the lower end with a waste pipe, *i*, which passes down through the bottom of the refrigerator-box or room, and carries off the water. This ice-box rests on bars running across the refrigerator-box, and is placed a little distance from the sides, to give a passage for the free circulation of air.

An ice-box of the construction herein described is peculiarly adapted to the cooling and free circulation of air, and is thereby rendered well qualified for the preservation of fruits, meats, and all other perishable articles of food.

Having thus described my invention, what I claim, and desire to secure by Letters Patent, is—

I claim the combination with the open frame ice-box A E. the movable rack C, movable corrugated plate F, movable rack *g*, trough H, and waste pipe *i*, with a refrigerator or provision-room, for the purpose herein specified.

M. C. LONGACRE.

Witnesses:

ALFRED ELWELL,

GEO. W. TIBBITTS.